Dec. 31, 1929.  P. KOLLSMAN  1,741,702
INDICATOR
Filed Aug. 6, 1929
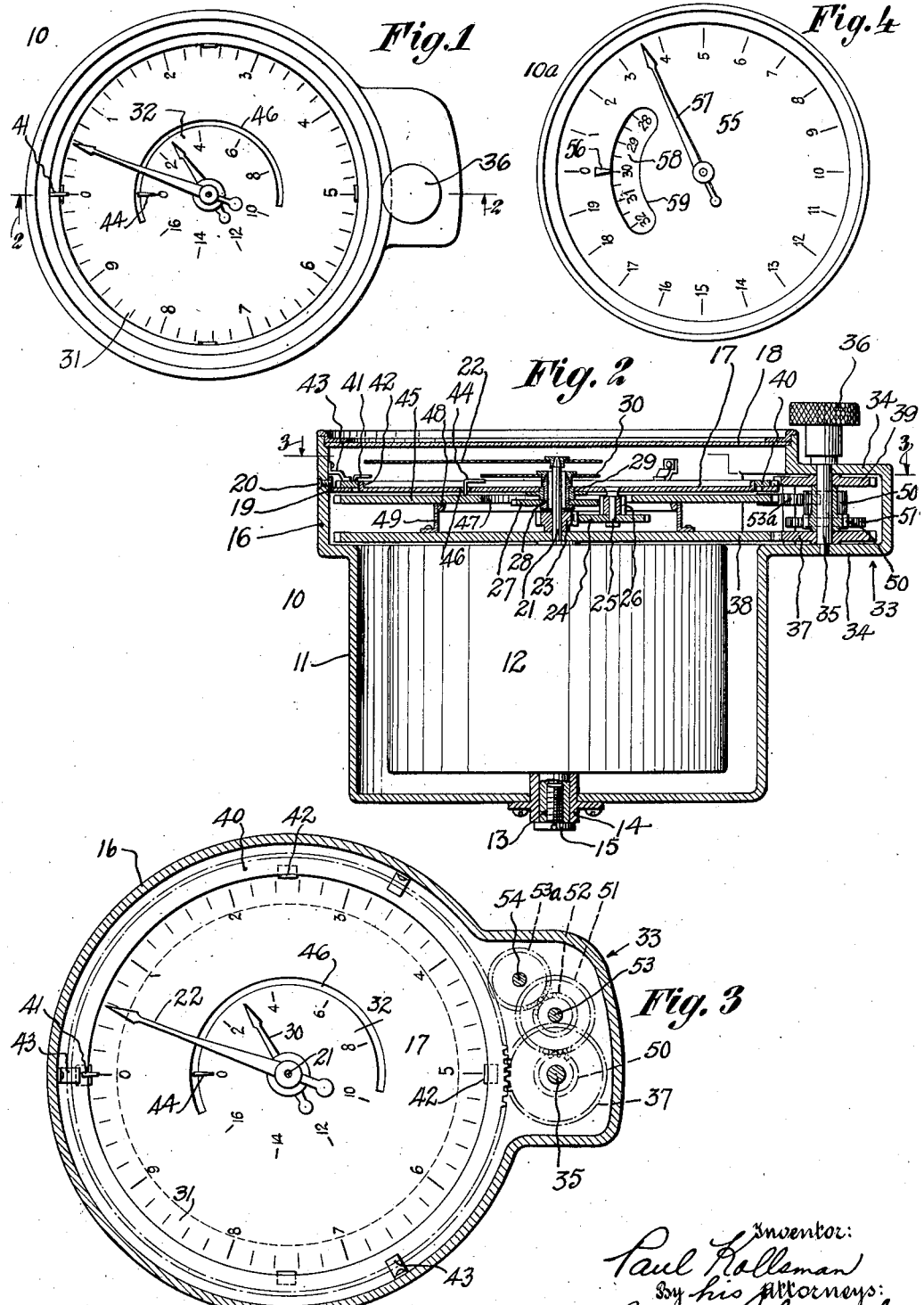

Patented Dec. 31, 1929

1,741,702

UNITED STATES PATENT OFFICE

PAUL KOLLSMAN, OF WOODHAVEN, NEW YORK

INDICATOR

Application filed August 6, 1929. Serial No. 383,931. REISSUED

This invention relates to indicators.

One object of the invention is to provide an improved device of the character described in which a reference member and an indicating member are associated together for a synchronous movement for any required condition.

While this invention is applicable to a wide range of uses, and in connection with indicating devices of various types, it may be stated that in certain indicators a reference mark is mounted for movement together with a dial to permit a rapid reading to be made of the condition shown by the pointer. This arrangement has the disadvantage that when the dial is turned from its initial position, the indicia thereon are no longer vertical, so that it becomes difficult to note the indicator reading. Furthermore, it is not possible on a comparatively small dial to obtain a reading which will be sufficiently accurate within a large range, as is done, for example, with indicators having a plurality of co-ordinated pointers, which coact with scales of different values. It is therefore an object of this invention to overcome these drawbacks.

Another object of this invention is to provide an improved device of the nature set forth having a movable reference mark which is synchronized with a plurality of pointers.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a plan view of a device embodying the invention.

Fig. 2 is an enlarged view in vertical section taken on line 2—2 of Fig. 1.

Fig. 3 is a plan view in section taken on line 3—3 of Fig. 2.

Fig. 4 is a plan view of a modification of the invention.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Generally described, the invention provides an indicator having indicia of any suitable nature which are formed on a scale according to any desired type, including, for instance, the cylindrical and circular scales. Coordinated with the scale are one or more pointers and also one or more reference marks. The latter may be variously formed, and can also be in the nature of graduated scales. The pointers and reference marks are movable synchronously by any desired means, whether manually or mechanically, for an initial setting. The indicator per se turns with the pointers, maintaining an accurate reading under all conditions. The mechanism for interconnecting the pointers, the reference mark, and the indicator itself for turning is merely illustrative, and the result may be accomplished in other ways. Although the indicator itself is shown herein as turning in presetting the device, it may be understood that this is done in order to simplify the said mechanism and is not of the essence of the invention.

Although the invention finds its maximum utility when applied to altitude indicating devices that are employed in aircraft, it can be advantageously used with indicators for temperature, stress, flow, and the like.

Referring in detail to the drawing, 10 denotes a device embodying the invention. The same includes a cylindrical casing or the like 11 in which is housed any desired indicator 12. As the invention is not restricted to any particular type of indicator, the latter is shown in conventionalized form. It may be stated, however, that the said indicator is preferably an altimeter of any well known type. This indicator may be rotatably mounted in the casing, for example, by a central stub shaft 13 fixed to the casing, and which extends into a hub 14 on the casing, a screw 15 being threaded into the stub shaft to retain the same in engagement in the hub.

The front part of the casing may include a circular enlargement 16 in which the dial 17 and the glass 18 are positioned. The said dial is relatively non-rotatable and may be secured in any suitable manner. For purposes of illustration, I show the dial as having one or more lugs 19 formed therein and attached to the part 16 by screws 20.

Extending centrally from the indicator 12 is a spindle 21 that is turned by the indicator mechanism in response to any condition that is to be indicated or measured. On the end of said spindle is mounted a pointer 22.

Fixed on the spindle 21 is a pinion 23, the teeth of which mesh with those of a gear 24. The latter is journaled on a pin 25 that is secured to a stationary member such as the dial 17. Rotating with the gear 24 in alined relation therewith is a pinion 26 the teeth of which mesh with those of a gear 27. The latter is fixed to a sleeve 28 through which freely extends the spindle 21, said sleeve being journaled on a hub 29 secured to the dial. Mounted in any suitable manner on the sleeve is a pointer 30 which may coact with the pointer 22.

On the dial 17 are one or more scales 31, 32 which are of any suitable form to coact with the pointers. To illustrate, if the device is used as an altimeter, the scale 31 totals an elevation of one thousand feet, while the scale 32 may indicate a maximum of seventeen housand feet. But the scales can be changed to show any other elevations.

The gear train which includes the pinions 23, 26 and the gears 24, 27 interconnecting the pointers is of coures so designed as to cause the latter to move in proper relation to the scales. The mechanism, for turning the indicator, the pointers and the reference marks in synchronism will now be described.

Formed in the casing portion 16 is a pocket 33 having opposite walls 34 in which is journaled a spindle 35. On one end of the same is an external fingerpiece 36 for turning the spindle. Mounted on the spindle is a gear 37 the teeth of which mesh with those of a large gear 38 that is connected in any suitable manner with the indicator 12 or the spindle 21 thereof.

Also mounted on the spindle 35 is another gear 39 the teeth of which mesh with those of a larger gear 40. The latter is concentric with the indicator and carries a reference mark 41 coacting with the large scale 31. The gear 40 may be mounted in any suitable manner, and as shown herein consists of a ring that overlies and rests against the dial 17, and is journaled on concentric lugs 42 struck therefrom.

To retain the said gear ring in position, finger pieces 43 may be secured to the casing to bear against the gear ring.

The gear train 39, 40 is designed to cause the reference mark 41 to move at the same velocity as the large pointer 22, and hence the indicator 12, and the gear train 37, 38.

Associated with the scale 32 is a reference mark 44 which is movable in synchronism by the following means. The said reference mark 44 is carried by a large gear 45 at the underside of the dial 17. The latter has an arcuate slot 46 through which said reference mark extends. The gear 45 is mounted for rotation in any suitable manner. Thus it may have its central portion removed to provide an opening 47. Secured to the gear in spaced relation to said opening is a ring member 48, that is concentric therewith, and which is journaled in a drum or band 49 that is secured to the gear 38.

Interconnecting the spindle 35 and the gear 45 is a gear train including a pinion 50 on the spindle, a gear and pinion 51, 52 on a shaft 53 that is journaled in the walls 34, and a gear 53ª, on a similarly mounted shaft 54. The teeth of the gear 53 mesh with those of the large gear 45. The reference mark 44 is thus movable synchronously with the pointer 30.

In Fig. 4 is shown a modification 10ª of the invention in which a dial 55, and a reference mark 56 are both stationary, while the pointer 57 is rotatingly adjustable together with a scale 58 associated with the reference mark. The latter may be of segmental or ring form and a portion thereof at the reference mark is visible through an opening 59 in the dial. Accordingly, it is seen that instead of moving the reference mark as shown in Figs. 1 to 3, an associated scale may be moved, the scale and reference mark thus constituting a reference means. The relative movement of the scale 58 and the pointer 57 may be according to any suitable graduation, and in the same or opposite direction, this being readily accomplished by any gear train used for the purpose. In all other respects this device is like the one first described.

It will thus be seen that I have provided a device which fulfills the several objects of the invention and which is well adapted to meet the conditions of practical use.

I claim:

1. A device of the character described, including an indicator, said indicator having scale means, a pointer, a reference means, other means coacting with the pointer and the reference means to cause them to move relatively to each other in synchronism with respect to the scale means, and means to cause the pointer and reference means to move through equal angles in setting the device.

2. A device of the character described, including means having indicia thereon, movable pointer means, a reference means movable with respect to said pointer means as a unit therewith and in predetermined relation with respect to said indicia, and other means to simultaneously move the reference and pointer means for setting the same.

3. A device of the character described, including a movable indicator having relatively stationary scale means, a pointer, reference means independent of the pointer, unitary means to move the reference means into any desired position with respect to the scale means, and the pointer and indicator in coordination with the reference means, and means to move the reference means and the pointer simultaneously and in an equal degree with respect to the scale means.

4. A device of the character described, including a movable indicator having relatively stationary scale means, a pointer, actuating means to normally operate the pointer, a reference means, the pointer being movable with respect to the reference means, and adjusting means to move the reference means, the pointer, and the indicator while maintaining their relative position with respect to the scale means to set the reference means in any desired position with the pointer moving for setting independently of the said actuating means.

5. A device of the character described, including means having indicia thereon, pointer means, reference means, other means to move the pointer means, and the reference means with respect to said indicia and in predetermined ratio for an initial setting of the device, and actuating means operating the pointer means independently of the reference means for indicating movement.

6. A device of the character described, including means having indicia thereon, pointer means, reference means, manual means to move the pointer means and the reference means with respect to said indicia and in predetermined relation for an initial setting of the device, and actuating means operating the pointer means independently of the reference means for indicating movement.

7. A device of the character described, including a circular, non-rotatable scale means, a pointer and reference means movable in concentric relation with the scale means, means to move the pointer and the reference means with respect to said scale means in predetermined relation for an initial setting of the device, and actuating means to operate the pointer independently of the reference means, for indicating movement with respect to said scale means from the preset position.

8. A device of the character described, including circular, non-rotatable scale means, a plurality of pointers associated with the scale means, one of the pointers making a complete rotation for a given movement of the other pointer, reference mark means associated with the pointers and the scale means, means to move the pointers and the reference mark means in predetermined ratio, for an initial setting of the device, and actuating means to operate the pointers independently of the reference mark means for indicating movement with respect to said scale means from the preset position.

9. A device of the character described, including circular, non-rotatable scale means, a plurality of pointers, one of the pointers making a complete rotation for a given movement of the other pointer, reference mark means associated with the pointers and the scale means, means to move the pointers and the reference mark means in predetermined ratio, for an initial setting of the device, and actuating means to operate the pointers independently of the reference mark means for indicating movement with respect to said scale means from the preset position, said actuating means being connected to the means for moving the pointers and turning with the latter in the setting of the device.

10. A device of the character described, including a circular, non-rotatable scale means, a pointer and a reference means movable in concentric relation with the scale means, adjusting means to move the pointer and the reference means with respect to said scale means in predetermined ratio for an initial setting of the device, and actuating means to operate the pointer independently of the reference means for indicating movement with respect to said scale means from the preset position, the actuating means being connected to the adjusting means to turn with the pointer for the initial setting mentioned.

11. A device of the character described, including a movable indicator having relatively stationary scale means, a pointer, reference means independent of the pointer, and unitary means to move the reference means into any desired position with respect to the scale means, and the pointer and indicator in coordination with the reference means, said unitary means including a rotatable member of relatively large diameter disposed in proximity to the scale means, said rotatable member being connected to the indicator to move the same, and means in proximity to the front of the device for turning the rotatable member.

12. A device of the character described, including a rotatable indicator, the same having relatively stationary scale means, a pointer actuated by the indicator, reference means movable along the scale, and co-ordinated with the pointer, and adjusting means to move the indicator, the pointer and the reference means in predetermined relation to set the same with respect to the scale means, said adjusting means including a rotatable member of relatively large diameter in proximity to the scale means, the rotatable member being concentric with the indicator and being connected thereto, and manual means in proximity to the front of the device for turning the rotatable means and hence the indicator.

13. A device of the character described, including a rotatable indicator, the same having relatively stationary scale means, a pointer actuated by the indicator, reference means movable along the scale, and co-ordinated with the pointer, and adjusting means to move the indicator, the pointer and the reference means in predetermined relation to set the same with respect to the scale means, said adjusting means including manually operated means in proximity to the front of the device, the indicator having means in comparative proximity to the manually operated means and engaged thereby to rotate the indicator.

14. A device of the character described, including an indicator, scale means, pointer means, reference means, and other means co-acting with the pointer means, the indicator and the reference means to cause them to move in predetermined ratio with respect to the scale means.

15. A device of the character described, including a movable indicator, relatively stationary scale means, pointer means therefor, a relatively stationary reference mark, a reference scale means therefor, and means to move the indicator, the pointer means and the reference scale means with respect to the relatively stationary scale means and the reference mark.

16. A device of the character described, including a rotary indicator, a relatively stationary scale means, pointer means therefor actuated by the indicator, a relatively stationary reference mark, a movable reference scale means therefor, and unitary setting means to move the indicator and the pointer means with respect to the relatively stationary scale means and simultaneously the reference scale means with respect to the reference mark.

In testimony whereof I affix my signature.

PAUL KOLLSMAN.